US009963349B2

(12) United States Patent
Boorse et al.

(10) Patent No.: US 9,963,349 B2
(45) Date of Patent: May 8, 2018

(54) PREPARATION OF MESOPOROUS ZEOLITES WITH REDUCED PROCESSING

(71) Applicant: Rive Technology, Inc., Monmouth Junction, NJ (US)

(72) Inventors: R. Samuel Boorse, Skillman, NJ (US); Kunhao Li, Princeton, NJ (US)

(73) Assignee: Rive Technology, Inc., Monmouth Junction, NJ (US)

( * ) Notice: Subject to any disclaimer, the term of this patent is extended or adjusted under 35 U.S.C. 154(b) by 409 days.

(21) Appl. No.: 14/966,674

(22) Filed: Dec. 11, 2015

(65) Prior Publication Data
US 2016/0167973 A1 Jun. 16, 2016

Related U.S. Application Data

(60) Provisional application No. 62/090,680, filed on Dec. 11, 2014.

(51) Int. Cl.
C01B 39/24 (2006.01)
B01J 29/08 (2006.01)
C01B 39/02 (2006.01)
C01B 39/20 (2006.01)
B01J 35/10 (2006.01)

(52) U.S. Cl.
CPC ............ C01B 39/24 (2013.01); B01J 29/084 (2013.01); C01B 39/026 (2013.01); C01B 39/20 (2013.01); B01J 35/109 (2013.01); B01J 35/1061 (2013.01); B01J 2029/081 (2013.01); B01J 2229/37 (2013.01); B01J 2229/38 (2013.01); C01P 2006/17 (2013.01)

(58) Field of Classification Search
CPC ....... C01B 39/026; C01B 39/20; C01B 39/24; C01P 2006/17; B01J 29/084; B01J 35/1061; B01J 35/109; B01J 2029/081; B01J 2229/37; B01J 2229/38
See application file for complete search history.

(56) References Cited

U.S. PATENT DOCUMENTS

| | | |
|---|---|---|
| 3,709,853 A | 1/1973 | Karapinka |
| 3,864,280 A | 2/1975 | Schneider |
| 4,016,218 A | 4/1977 | Haag et al. |
| 4,088,671 A | 5/1978 | Kobylinski |
| 4,196,182 A | 4/1980 | Willermet et al. |
| 4,205,055 A | 5/1980 | Maire et al. |
| 4,263,268 A | 4/1981 | Knox et al. |
| 4,318,824 A | 3/1982 | Turner |
| 4,439,349 A | 3/1984 | Everett et al. |
| 4,564,207 A | 1/1986 | Russ et al. |
| 4,609,972 A | 9/1986 | Edeling et al. |
| 4,637,623 A | 1/1987 | Bubik |
| 4,675,377 A | 6/1987 | Mobley et al. |
| 4,689,314 A | 8/1987 | Martinez et al. |
| 4,704,375 A | 11/1987 | Martinez et al. |
| 4,761,272 A | 8/1988 | Hucke |
| 4,775,655 A | 10/1988 | Edwards et al. |
| 4,806,689 A | 2/1989 | Gier et al. |
| 4,816,135 A | 3/1989 | Martinez et al. |
| 4,836,737 A | 6/1989 | Holmes et al. |
| 4,857,494 A | 8/1989 | Martinez et al. |
| 4,871,283 A | 10/1989 | Wright |
| 4,891,458 A | 1/1990 | Innes et al. |
| 4,894,215 A | 1/1990 | Kawakubo et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,057,296 A | 10/1991 | Beck |
| 5,061,147 A | 10/1991 | Nespor |
| 5,095,169 A | 3/1992 | Skeels et al. |
| 5,102,643 A | 4/1992 | Kresge et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rosi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |

(Continued)

FOREIGN PATENT DOCUMENTS

| | | |
|---|---|---|
| JP | 2002128517 | 5/2002 |
| JP | 2004143026 | 5/2004 |

(Continued)

OTHER PUBLICATIONS

Greon et al, "Decoupling mesoporosity formation and acidity modification in ZSM-5 zeolites by sequential desclication-dealumination", Microporous and Mesoporous Materials, 87 (2005) pp. 153-161.*

(Continued)

Primary Examiner — David M Brunsman
(74) Attorney, Agent, or Firm — Hovey Williams LLP

(57) ABSTRACT

Methods for introducing mesoporosity into zeolitic materials are described herein that employ an acid treatment, an optional surfactant treatment, and a base treatment without filtration or purification steps between the steps. In particular, the process generally involves subjecting a zeolitic material to an acid treatment followed by a surfactant treatment and base treatment. The methods can efficiently introduce mesoporosity into various zeolitic materials, such as zeolites.

53 Claims, No Drawings

(56) References Cited

U.S. PATENT DOCUMENTS

| | | |
|---|---|---|
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Duguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,024,899 A | 2/2000 | Peng et al. |
| 6,027,706 A | 2/2000 | Pinavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,833,012 B2 | 12/2004 | Rogers |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,936,234 B2 | 8/2005 | Bilenko |
| 6,998,104 B2 | 2/2006 | Tao et al. |
| 7,084,087 B2 | 8/2006 | Shan et al. |
| 7,589,041 B2 | 9/2009 | Ying et al. |
| 7,807,132 B2 | 10/2010 | Garcia-Martinez |
| 7,976,696 B2 | 7/2011 | Ying et al. |
| 8,007,663 B2 | 8/2011 | Ying et al. |
| 8,008,223 B2 | 8/2011 | Garcia-Martinez |
| 9,580,328 B2 * | 2/2017 | Martinez ............... B01J 29/041 |
| 2001/0031241 A1 | 10/2001 | Lacombe et al. |
| 2001/0042440 A1 | 11/2001 | Miyazawa et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0074396 A1 | 4/2005 | Takahashi et al. |
| 2005/0130827 A1 | 6/2005 | Schunk |
| 2005/0214539 A1 | 9/2005 | Ying et al. |
| 2006/0078487 A1 | 4/2006 | Endo et al. |
| 2007/0244347 A1 | 10/2007 | Ying et al. |
| 2009/0110631 A1 | 4/2009 | Garcia-Martinez |
| 2010/0190632 A1 | 7/2010 | Dight |
| 2010/0196263 A1 | 8/2010 | Garcia-Martinez |
| 2011/0118107 A1 | 5/2011 | Garcia-Martinez |
| 2011/0171121 A1 | 7/2011 | Senderov |
| 2012/0258852 A1 | 10/2012 | Martinez et al. |
| 2013/0183231 A1 | 7/2013 | Senderov et al. |

FOREIGN PATENT DOCUMENTS

| | | |
|---|---|---|
| WO | 2001017901 | 3/2001 |
| WO | 2001038223 | 5/2001 |
| WO | 2005102964 | 11/2005 |
| WO | 2006031259 | 3/2006 |
| WO | 2006/038912 | 4/2006 |

OTHER PUBLICATIONS

Al-Khattaf, S. et al., The Role of Diffusion in Alkyl-Benzenes Catalytic Cracking, Appl. Catal. A: Gen. 226; 139-153, (2002).

Bagri, R. et al.; Catalytic Pyrolysis of Polyethylene; Anal. Pyrolysis, 63:29-41 (2002).

Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.

Corma, A., From Microporous to Mesoporous Molecular Sieve Materials and Their Use in Catalysis, Chem. Rev., 97:2373-2419, (1997).

CSIC NM014—Method of Preparation of Mesoporous Alumina with High Thermal Stability, http://www.serina.es/escaparate/verproducto.cgi?idproducto=4980&refcompra=NULO, downloaded May 9, 2007, 2 pages.

(56) References Cited

OTHER PUBLICATIONS

Davis, M.E., Ordered Porous Materials for Emerging Applications, Nature, 417:813-821 (2002).
Davis, M.E., Zeolite and Molecular Sieve Synthesis, Chem. Mater., 4:756-768 (1992).
De Moor, P-P.E.A. et al., Imaging the Assembly Process of the Organic-Mediated Synthesis of a Zeolite, Chem. Eur. J., 5(7):2083-2088 (1999).
Degnan, T.F. et al., History of ZSM-5 Fluid Catalytic Cracking Additive Development at Mobile, Microporous Mesoporous Mater., 35-36:245-252 (2000).
De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).
Galo, J. de A. A. et al., Chemical Strategies to Design Textured Materials: from Microporous and Mesoporous Oxides to Nanonetworks and Hierarchical Structures, Chern. Rev., 2002, 102, 4093-4138.
Geidel, E. et al., Characterization of Mesoporous Materials by Vibrational Spectroscopic Techniques, Microporous and Mesoporous Mater., 65:31-42 (2003).
Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).
Goto, Y., Mesoporous Material from Zeolite, Journal of Porous Materials, 9, 2002, pp. 43-48.
Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.
Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.
Harding, R.H. et al., New Developments in FCC Catalyst Technology, Appl. Catal. A:Gen. 221:389-396 (2001).
Huang, L. et al., Investigation of Synthesizing MCM-41/ZSM Composites, J. Phys. Chem. B. 104:2817-2823 (2000).
Iijima, S., Carbon Nanotubes: Past, Present, and Future, Physica B: Condensed Matter, www.elsevier.com/locate/physb, 2002, 323, pp. 1-5.
International Search Report and Written Opinion dated Nov. 7, 2005 from International Patent Application No. PCT/US2005/05918, filed Feb. 25, 2005.
Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.
Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).
Kloestra, K.R. et al., Mesoporous Material Containing Framework Tectosilicate by Pore-Wall Recrystallization, Chem. Commun., 23:2281-2282 (1997).
Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.
Lee, H. H et al., Materials Science: On the Synthesis of Zeolites, ScienceWeek, downloaded from http://www.scienceweek.com/2003/sa031031-1.htm on Apr. 23, 2005, 5 pages.
Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.
Linssen, T. et al., Mesoporous Templated Silicates: An Overview of Their Synthesis, Catalytic Activation and Evaluation of the Stability, Advances in Colloid and Interface Science, 103:121-147 (2003).
Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).
Liu, Y.et al.,Aluminosilicate Mesostructures with Improved Acidity and Hydrothermal Stability, J. Mater. Chem., 12:3179-3190 (2002).
Lyons, D.M. et al., Preparation of Ordered Mesoporous Ceria with Enhanced Thermal Stability, The Journal of Materials Chemistry, vol. 12, pp. 1207-1212 (2002).
Mendes, M.F. et al., Optimization of the Process of Concentration of Vitamin E from DDSO using Supercritical CO2, Brazilian Journal of Chemical Engineering, vol. 22, No. 01, pp. 83-91, Jan.-Mar. 2005.
Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.
Ogura, M. et al., Formation of Uniform Mesopores in ZSM-5 Zeolite through Treatment in Alkaline Solution, Chemistry Letters 2000, pp. 882-883.
On, D.T. et al., Large-Pore Mesoporous Materials with Semi-Crystalline Zeolitic Frameworks, Angew. Chem. Int. Ed., 17:3248-3251 (2001).
Park, D.W. et al., Catalytic Degration of Polyethylene Over Solid Acid Catalysts, Polym. Degrad. Stabil., 65:193-198 (1999).
Patarin, J. et al., Mild Methods for Removing Organic Templates from Inorganic Host Materials, Highlights, Angew. Chem. Int. Ed. 2004, 43:3878-3880.
Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.
Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.
Scherzer, J. et al., Octane-Enhancing Zeolitic FCC Catalysts—Scientific and Technical Aspects, Marcel Dekker, Inc., 42 pages, (1990).
Storck, S. et al., Characterization of Micro- and Mesoporous Solids by Physisorption Methods and Pore-Size Analysis, Applied Catalysts A: Gen. 17:137-146 (1998).
Tao et al., Mesopore-Modified Zeolites: Preparation, Characterization, and Applications, Chem. Rev., vol. 106, pp. 896-910 (2006).
Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).
Verhoef, M. J. et al., Partial Transformation of MCM-41 Material into Zeolites: Formation of Nanosized MFI Type Crystallites, Chemical Materials, 2001, vol. 13, pp. 683-687.
Yang, P. et al., Generalized Syntheses of Large-Pore Mesoporous Metal Oxides with Semicrystalline Frameworks, Nature, vol. 396, Nov. 12, 1998, pp. 152-155; www.nature.com.
Ying, J. Y. et al., Synthesis and Applications of Supramolecular-Templated Mesoporous Materials, Angew. Chem. Int. Ed., 38:56-77 (1999).
Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.
Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.
Xia, Yongde et al., On the synthesis and characterization of ZSM-5/MCM-48 aluminosilicate composite materials, Journal of the Royal Society of Chemistry, 2004, pp. 863-870.
Guo et al., Characterization of Beta/MCM-41 Composite Molecular Sieve Compared with the Mechanical Mixture Microporous and Mesoporous Materials, vols. 44-45; pp. 427-434.

(56) References Cited

OTHER PUBLICATIONS

Tao et al., ZSM-5 Monolith of Uniform Mesoporous Channels, Material Sciences, Chiba University, J. AM. Chem. Soc., Japan 2003, pp. 6044-6045.
Search Report and Written Opinion dated Feb. 18, 2016 for related PCT Application No. PCT/US2015/065278; 19 pages.
Hadlington, S, Novel Ion-Exchange Technique for Zeolites, Royal Society of Chemistry News, Jun. 29, 2005, 4 pages.

* cited by examiner

PREPARATION OF MESOPOROUS ZEOLITES WITH REDUCED PROCESSING

RELATED APPLICATIONS

This application claims the priority benefit under 35 U.S.C. § 119(e) of U.S. Provisional Patent Application Ser. No. 62/090,680 entitled "PREPARATION OF MESOPOROUS ZEOLITES WITH REDUCED PROCESSING," filed Dec. 11, 2014, the entire disclosure of which is incorporated herein by reference.

BACKGROUND

1. Field of the Invention

One or more embodiments of the invention relate to methods for preparing mesoporous zeolites. More particularly, various embodiments described herein relate to the preparation of mesoporous zeolites via a process that utilizes minimal filtration steps.

2. Description of the Related Art

Previously, methods have been described for introducing mesoporosity into zeolites such as, for example, in U.S. Pat. No. 7,589,041. As previously described, these zeolites can be treated in the presence of a pore forming agent (e.g., a surfactant) at a controlled pH under a set of certain time and temperature conditions to introduce mesoporosity into the zeolite. Thereafter, the mesostructured material can be treated to remove the pore forming agent (e.g., by calcination or chemical extraction). Although advances have been made in the art of introducing mesoporosity into zeolites, improvements are still needed.

SUMMARY

One or more embodiments of the present invention concern a method for producing a material comprising a mesoporous zeolite. The method comprises: (a) contacting an initial zeolite with an acid to produce an acid-treated zeolite, wherein the contacting of step (a) is carried out in a first slurry comprising a first solid phase and a first liquid phase; and (b) subsequent to step (a), contacting the acid-treated zeolite with a base to thereby provide a base-treated zeolite, wherein the contacting of step (b) is carried out in a second slurry comprising a second solid phase and a second liquid phase, wherein at least 30 weight percent of the first liquid phase is also present in the second liquid phase, the 20 to 80 Å diameter mesopore volume of the base-treated zeolite is greater than the mesopore volume of the initial zeolite, and the pH of the second liquid phase is higher than the pH of the first liquid phase.

One or more embodiments of the present invention concern a method for producing a material comprising a mesoporous zeolite. The method comprises: (a) contacting an initial zeolitic material with an acid to thereby form a first mixture comprising at least a portion of the acid, an acid-treated zeolitic material, and a liquid; (b) contacting the first mixture with a surfactant to thereby form a second mixture comprising at least a portion of the surfactant, at least a portion of the acid, at least 30 weight percent of the liquid from the first mixture, and a surfactant-treated zeolitic material; (c) contacting the second mixture with a base to thereby form a third mixture comprising at least a portion of the acid, at least a portion of the surfactant, at least a portion of the base, at least 30 weight percent of the liquid from the first mixture, and a base-treated zeolitic material; and (d) recovering at least a portion of the base-treated zeolitic material from the third mixture to thereby form the mesoporous zeolitic material.

One or more embodiments of the present invention concern a method for producing a material comprising a mesoporous zeolite. The method comprises: (a) contacting an initial zeolite with an acid to produce an acid-treated zeolite, wherein the contacting of step (a) is carried out in a first slurry comprising a first solid phase and a first liquid phase; and (b) subsequent to step (a), contacting the acid-treated zeolite with a base and a surfactant to thereby provide a base-treated zeolite, wherein the contacting of step (b) is carried out in a second slurry comprising a second solid phase and a second liquid phase, wherein at least 30 weight percent of the first liquid phase is also present in the second liquid phase, the 20 to 80 Å diameter mesopore volume of the base-treated zeolite is greater than the mesopore volume of the initial zeolite, and the pH of the second liquid phase is higher than the pH of the first liquid phase.

DETAILED DESCRIPTION

Various embodiments of the present invention concern methods for preparing a material containing a mesoporous zeolitic material. More particularly, the present invention is generally related to a method that can more efficiently incorporate mesoporosity into a zeolitic material. Unlike existing mesopore forming methods, which generally utilize filtration steps between the additions of their various reactants, the method described herein can exclude one or more of these filtration steps. Consequently, the method described herein can allow for a more efficient process that can exclude unnecessary treatment steps, while maintaining or increasing the resulting yield of mesoporous zeolitic materials.

In certain embodiments, each of the steps in the method described herein can take place in the same reactor and/or slurry without the need for additional filtration, other than the final solid/liquid separation to recover the mesoporous zeolite. In various embodiments, the method can involve subjecting an initial zeolitic material to an acid treatment, base treatment, and surfactant treatment in a particular order and without any filtration treatments between these treatments.

The method of the present invention can involve a number of treatment steps including, but not limited to, an acid treatment step, a surfactant treatment step, and a base treatment step, which can occur in any order and/or separately or concurrently. Furthermore, one or more of the above treatment steps may be excluded or modified depending on the initial zeolitic material to be treated and the desired properties to be obtained in the mesoporous product. The method of the present invention and its various embodiments are further described in the following description.

Methods for mesopore incorporation contemplated by various embodiments of the present invention (e.g., introduction of mesoporosity in zeolites) can generally include the following steps:

1. Contacting a slurry containing an initial zeolitic material with an acid, optionally in the presence of a surfactant, under various time and temperature conditions to form an acid-treated zeolite.
2. Optionally contacting the treated slurry containing the acid-treated zeolite with a surfactant to produce a surfactant-treated zeolite, wherein the treated slurry has not been subjected to a purification or filtration step before contacting the surfactant.

3. Contacting the treated slurry comprising the acid-treated zeolite and/or surfactant-treated zeolite with a base, optionally in the presence of a surfactant, to produce a base-treated zeolite, wherein the treated slurry has not been subjected to a purification or filtration step before contacting the base.
4. Removing and/or recovering the surfactant (if present), for example, by calcination (removal) and/or chemical extraction (recovery).
5. Chemically modifying the resulting material (e.g., by ion exchange with rare earths; blending with binders, matrix, and additives; and shaping (e.g., into beads, pellets, and FCC micropsheres).

In one or more embodiments, the mesopore formation process can be performed employing any reagents and any conditions described in U.S. Pat. No. 7,589,041, the entire disclosure of which is incorporated herein by reference.

For ease of reference, the method is described below as occurring in a specific order. Although the following description depicts a specific order of treatment steps for description purposes, one skilled in the art would appreciate that the timing, frequency, and utilization of the various treatment steps described herein can be varied. For example, one could combine certain treatment steps (e.g., the surfactant treatment and base treatment) or vary the order of one or more of the acid treatment step, surfactant treatment step, and base treatment step from the order described below as long as no filtration and/or purification steps were implemented between these steps.

As noted above, an initial zeolitic material can be employed in forming the mesoporous zeolitic materials described herein. In one or more embodiments, the initial zeolitic material can be a non-mesostructured zeolitic material. In other various embodiments, the initial zeolitic material can be a non-mesoporous zeolitic material. As used herein, the term "non-mesoporous" shall denote a composition having a total volume of 20 to 80 Å diameter mesopores of less than 0.05 cc/g. In one or more embodiments, the initial zeolitic materials can have a total 20 to 80 Å diameter mesopore volume of less than 0.01 cc/g. Additionally, suitable initial zeolitic materials can have a total 1 to 20 Å micropore volume of at least 0.3 cc/g.

In various embodiments, the initial zeolitic material can have a 1-dimensional, 2-dimensional, or 3-dimensional pore structure. Additionally, the initial zeolitic material can itself exhibit long-range crystallinity. Materials with long-range crystallinity include all solids with one or more phases having repeating structures, referred to as unit cells, that repeat in a space for at least 10 nm. A long-range crystalline zeolitic material structure may have, for example, single crystallinity, mono crystallinity, or multi crystallinity. Furthermore, in various embodiments, the initial zeolitic material can be fully crystalline. Additionally, the initial zeolitic material can be a one-phase hybrid material. Examples of zeolitic materials suitable for use as the initial zeolitic material include, but are not limited to, metal oxides, zeolites, zeotypes, aluminophosphates, silico-aluminophosphates, gallophosphates, zincophosphates, and titanophosphates. Combinations of two or more types of these zeolitic materials can also be employed as the initial zeolitic material. In addition, the zeolitic material can be a zeolite-like material, which represents a growing family of inorganic and organic/inorganic molecular sieves.

In one or more embodiments, the initial zeolitic material comprises a zeolite. Examples of zeolites suitable for use as the initial zeolitic material include, but are not limited to, zeolite A, faujasites (a.k.a., zeolites X and Y; "FAU"), mordenite ("MOR"), CHA, ZSM-5 ("MFI"), ZSM-12, ZSM-22, beta zeolite, synthetic ferrierite (ZSM-35), synthetic mordenite, and mixtures of two or more thereof. Additionally, ultra-stable (e.g., zeolite USY) and/or acid forms of zeolites can also be employed. In various embodiments, the initial zeolitic material can comprise faujasite, mordenite, ZSM-5, or mixtures of two or more thereof. In certain embodiments, the initial zeolitic material comprises faujasite. In one or more embodiments, the zeolite can be a zeolite Y selected from the group consisting of USY, $NH_4Y$, NaY, a rare earth ion zeolite Y, or mixtures thereof. When a zeolite is employed as the initial zeolitic material, the zeolite can have an average unit cell size of at least 24.40, at least 24.45, or at least 24.50 Å.

As used herein, "zeolite" can comprise any one the zeolitic materials listed in the database of zeolite structures by the International Zeolite Association (IZA).

In one or more embodiments, the initial zeolitic material can be present as a part of a composite shaped article comprising at least one zeolitic material (e.g., a zeolite) and at least one non-zeolitic material. In one or more embodiments, the zeolitic material in the composite shaped article can be a zeolite. Furthermore, the zeolitic material can comprise a zeolite selected from the group consisting of faujasite, mordenite, ZSM-5, CHA, or mixtures of two or more thereof. In various embodiments, the zeolite comprises faujasite. The composite shaped article can comprise the zeolitic material (e.g., a zeolite) in an amount of at least 0.1 weight percent, at least 15 weight percent, or at least 30 weight percent based on the total weight of the composite shaped article. Furthermore, the composite shaped article can comprise the zeolitic material (e.g., a zeolite) in an amount in the range of from about 0.1 to about 99 weight percent, in the range of from about 5 to about 95 weight percent, in the range of from about 15 to about 70 weight percent, or in the range of from 30 to 65 weight percent based on the total weight of the composite shaped article. The non-zeolitic material of the composites shaped article can include, for example, one or more binder material components.

In various embodiments, the initial zeolitic material can have a silica to alumina molar ratio of at least 3.0, 3.5, 4.0, 4.5, 5.0, or 5.3 and/or not more than 120, 75, 50, 20, 10, or 5.7. Furthermore, in certain embodiments, the initial zeolitic material can have a silica to alumina molar ratio in the range of 3 to 120, 3.5 to 75, 4 to 50, 4.5 to 20, 5 to 10, or 5.3 to 5.7. Generally, the silica to alumina molar ratio can be determined via bulk chemical analysis.

In one or more embodiments, the initial zeolitic material can have a crystalline content of at least 10, 20, 25, 30, 35, 40, 45, 50, 55, 60, 65, 70, 75, 80, 85, 90, 95, or 99 weight percent, as measured by X-ray diffraction ("XRD").

In certain embodiments, the initial zeolitic material has a zeolite surface area ("ZSA") surface area in the range of 500 to 1,200 $m^2/g$, or 850 to 900 $m^2/g$. Additionally, in various embodiments, the initial zeolitic material can have a mesopore surface area ("MSA") in the range of 20 to 100 $m^2/g$, or less than 40 $m^2/g$. All surface areas are measured by applying BET theory and observing t-plot analysis of the gas sorption results.

In certain embodiments, the initial zeolitic material has not been previously subjected to any forms of pretreatment including, for example, steam treatment, thermal treatment, dealumination, and/or desilication.

In preparing the above-mentioned mesoporous materials, the initial zeolitic material can first optionally be combined with a liquid, such as water, to form an initial slurry. The water useful in forming the initial slurry can be any type of water. In various embodiments, the water employed in forming the optional initial slurry can be deionized water. In one or more embodiments, the initial zeolitic material can be present in the optional initial slurry in an amount in the range of from about 1 to about 50 weight percent, in the range of from about 5 to about 45 weight percent, in the range of from about 10 to about 40 weight percent, or in the range of from about 20 to about 35 weight percent.

After forming an initial slurry containing the initial zeolitic material, the initial slurry can be contacted with an acid to thereby produce a first treatment slurry comprising the slurry liquid, the acid, and an acid-treated zeolitic material. Alternatively, a dried zeolitic material that is not initially part of a slurry can be contacted with an acid to form the first treatment slurry comprising the acid and the acid-treated zeolitic material. The resulting slurry can have a solids content in the range of 5 to 60, 10 to 45, 15 to 40, or 20 to 35 weight percent. It should be noted that the solids will generally comprise the zeolitic material and small amounts of residual solids.

Acids suitable for use can be any organic or inorganic (mineral) acids. In various embodiments, the acid employed in this step of the formation process can be a dealuminating acid. In further embodiments, the acid can also be a chelating agent. The acid chosen can be any acid sufficient to produce an acid solution having a pH of less than 6, less than 4, less than 3, in the range of from about 1 to about 6, in the range of from about 2 to about 4, or in the range of from about 4 to about 6.

Specific examples of acids suitable for use include, but are not limited to, hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof. In various embodiments, the first treatment slurry can be prepared and/or subsequent mesopore formation steps can be performed in the absence or substantial absence of hydrofluoric acid. As used herein, the term "substantial absence" means a concentration of less than 10 parts per million by weight ("ppmw").

In one or more embodiments, a buffer solution can be employed during the acid treatment that uses a weak acid in combination with a weak acid salt to give a constant pH. For example, citric acid can be used with ammonium citrate to produce a constant pH, while other weak acids and weak acid salts can also be used.

In various embodiments, the amount of acid employed in the acid treatment can be in the range of from about 1 to about 10 milliequivalents per gram of the above-described initial zeolitic material, in the range of from about 2 to about 8 milliequivalents, or in the range of from 3 to 6 milliequivalents. Additionally, the acid can be added to the initial zeolitic material by any methods known or hereafter discovered in the art. In various embodiments, the acid can be added to the initial treatment mixture over a period of time. For example, the acid can be added to the initial zeolitic material over a period of time in the range of from about 5 minutes to about 10 hours, in the range of from about 10 minutes to about 5 hours, or in the range of from about 30 minutes to about 2 hours. Furthermore, in various embodiments, the acid can be added drop-wise to the initial zeolitic material. In one or more embodiments, the liquid phase in the resulting first treatment slurry can have a final pH in the range of from about 1.5 to 4, 2 to 3.5, or 2.5 to 3. As used herein, "final pH" defines the pH of the liquid phase of the slurry at the end of the respective treatment after all the relevant reagents have been added.

Though not wishing to be bound by theory, it is believed that contacting the above-described initial zeolitic material with an acid may at least partially dealuminate the initial zeolitic material.

Following the acid treatment, the pH of the liquid phase in the resulting treatment slurry can optionally be adjusted in an optional pH adjustment step. For example, the pH of the liquid phase in the treatment mixture can be adjusted to fall within the range of from about 4 to about 8, or in the range of from about 5 to about 7. Various pH adjusting agents (e.g., acids or bases) may be employed during this optional pH adjustment step.

After the acid treatment and optional pH adjustment steps, the resulting slurry can optionally be contacted with a pore forming agent, such as a surfactant, to form a second treatment slurry comprising the initial slurry liquid, the acid, the pore forming agent (e.g., the surfactant), and a surfactant-treated zeolitic material. In various embodiments, the resulting slurry from the acid treatment step is not subjected to any filtration or purification treatments prior to the addition of the pore forming agent. Rather, the pore forming agent can be added directly into the first treatment slurry during or after the acid treatment.

In one or more embodiments, at least 30, 50, 75, 90, or 99.9 weight percent of the liquid (e.g., acid and slurry liquid) originally present in the first treatment slurry can also be present in the second treatment slurry. In certain embodiments, substantially all or all of the liquid originally present in the first treatment slurry is also present in the second treatment slurry. Furthermore, the resulting slurry can have a solids content in the range of 5 to 60, 10 to 45, 15 to 40, or 20 to 35 weight percent. It should be noted that the solids will generally comprise the zeolitic material and small amounts of residual solids. Moreover, the surfactant-treated zeolite can comprise at least 20, 30, 50, 75, or 99.9 weight percent of the acid-treated zeolite from the acid treatment. In other words, substantially all or all of the acid-treated zeolite can be converted into the surfactant-treated zeolite.

In various embodiments, the pore forming agent comprises a surfactant. Any now known or hereafter discovered surfactants may be employed in the various embodiments described herein. In certain embodiments, a cationic surfactant can be employed. In one or more embodiments, the surfactant employed can comprise one or more alkyltrimethyl ammonium salts and/or one or more dialkyldimethyl ammonium salts. In various embodiments, the surfactant can be selected from the group consisting of cetyltrimethyl ammonium bromide ("CTAB"), cetyltrimethyl ammonium chloride ("CTAC"), behenyltrimethylammonium chloride ("B TAC"), and mixtures thereof. In certain embodiments, the surfactant comprises a non-ionic surfactant. Examples of suitable commercially available non-ionic surfactants include, but are not limited to, Pluronic™ surfactants (e.g., Pluronic P123™), available from BASF.

If utilized, the pore forming agent can be added to the first treatment slurry in the range of 0.01 to 0.2, 0.0125 to 0.1, 0.015 to 0.075, or 0.02 to 0.05 grams of pore forming agent per gram of dried zeolitic material.

It should be noted that, in various embodiments, the order of addition of the acid and the surfactant can be reversed. In other words, in certain embodiments, the initial zeolitic material (in slurry or solid form) can first be contacted with a surfactant followed by being contacted with an acid. In still other embodiments, the acid and surfactant can be combined prior to contact with the initial zeolitic material, thereby providing simultaneous or substantially simultaneous contact with the initial zeolitic material. In yet other embodiments, the acid treatment and the surfactant treatment may be performed at least partially separately. Additionally, in various embodiments, the above-described acid and surfactant treatment steps can be performed in the absence or substantial absence of a base.

In alternate embodiments, the process can be performed in the absence or substantial absence of a pore forming agent. Thus, in various embodiments, the process can be performed in the absence or substantial absence of a surfactant.

Any methods of agitation known or hereafter discovered in the art can be employed during the acid treatment and optional surfactant treatment. For example, stirring, shaking, rolling, and the like may be employed to agitate the resulting slurries. In one or more embodiments, the resulting slurries in either treatment can be agitated for a period of time ranging from about 1 minute to about 24 hours, from about 5 minutes to about 12 hours, from about 10 minutes to about 6 hours, or from about 30 minutes to about 2 hours. Furthermore, the resulting slurries can be heated (in the presence or absence of agitation) for a period of time. For instance, the resulting slurries can be heated at a temperature in the range of from about 30 to about 100° C., or in the range of from about 40 to about 80° C. for a period of time ranging from about 30 minutes to about one week, or in the range of from about an hour to about 2 days. Furthermore, any combination of room-temperature agitation and heated agitation can be employed.

Following the acid treatment and/or surfactant treatment, the pH of the liquid phase in the resulting treatment mixture can optionally be adjusted. For example, the pH of the liquid phase in the resulting treatment mixture can be adjusted to fall within the range of from about 5 to about 8, or in the range of from about 6 to about 7. Various pH adjusting agents (e.g., acids or bases) may be employed during this optional pH adjustment step.

After the optional pH adjustment step, the second treatment slurry can be contacted with a base to thereby produce a third treatment slurry comprising the liquid from the initial slurry (if utilized), the acid, the surfactant (if utilized), and a base-treated zeolitic material.

In various embodiments, the resulting slurry from the acid treatment and optional surfactant treatment steps is not subjected to any filtration or purification treatments prior to the addition of the base. Rather, the base can be added directly into the second treatment slurry during or after the surfactant treatment. In one or more embodiments, at least 30, 50, 75, 90, or 99.9 weight percent of the liquid (e.g., acid, surfactant, and slurry liquid) originally present in the second treatment slurry can also be present in the third treatment slurry. In certain embodiments, substantially all or all of the liquid originally present in the second treatment slurry is also present in the third treatment slurry.

The resulting third treatment slurry can have a solids content in the range of 5 to 60, 10 to 45, 15 to 40, or 20 to 35 weight percent. It should be noted that the solids will generally comprise the zeolitic material and small amounts of residual solids. Moreover, the base-treated zeolitic material can comprise at least 20, 30, 50, 75, or 99.9 weight percent of the acid-treated zeolitic material and/or the surfactant treated zeolitic material. In other words, substantially all or all of the acid-treated zeolite and/or surfactant-treated zeolite can be converted into the base-treated zeolite.

In certain embodiments, this base treatment step can involve treating the zeolitic material in a basic solution at an elevated temperature for an extended period of time. Generally, this basic desilication step can result in framework desilication.

Any base known or hereafter discovered can be employed in the various embodiments described herein for the base treatment. In various embodiments, the base can be selected from the group consisting of NaOH, quaternary ammonium hydroxides (e.g., $NH_4OH$), KOH, $Na_2CO_3$, TMAOH, $NaAlO_2$, and mixtures thereof. Additionally, the base employed can be in the form of a solution having a concentration in the range of from 0.2 to 15 percent. In various embodiments, the above-mentioned base can have a pH of at least 7, in the range of from about 8 to about 14, in the range of from about 8 to about 12, or in the range of from about 9 to about 11. In one or more embodiments, the resulting liquid phase in the third treatment slurry can have a final pH in the range of from about 5 to 11, 6 to 9.5, or 7 to 8.5.

In one or more embodiments, treatment of the acid-treated zeolitic material and/or the surfactant-treated zeolitic material with a base can be performed under elevated temperature conditions. In various embodiments, contacting the surfactant-treated zeolitic material with a base can be performed at a temperature in the range of from about 30 to about 200° C., in the range of from about 50 to about 150° C., or at about 80° C. Additionally, the amount of base employed can be such that the base is present at a ratio with the initial quantity of the initial zeolitic material (described above) in the range of from about 0.1 to about 20 mmol per gram of initial zeolitic material, in the range of from about 0.1 to about 5 mmol per gram of initial zeolitic material, or in the range of from about 0.9 to about 4 mmol per gram of initial zeolitic material. In other various embodiments, the amount of base employed can be such that the base is present at a ratio with the initial quantity of the initial zeolitic material (described above) of at least 2 mmol per gram of initial zeolitic material.

Furthermore, treatment with the base can be performed over a period of time. For example, treatment of the acid-treated zeolitic material and/or the surfactant-treated zeolitic material with a base can be performed over a period of time in the range of from about 1 minute to about 2 days, in the range of from about 30 minutes to about 1 day, in the range of from about 2 hours to about 20 hours, or in the range of from 16 to 18 hours.

Though not wishing to be bound by theory, it is believed that contacting the above-described zeolitic material with a base may cause at least partial desilication of the zeolite. Accordingly, in various embodiments, contacting the zeolitic material with a base may produce an at least partially desilicated zeolite. Furthermore, in certain embodiments, some desilication-based mesoporosity may be introduced into the zeolitic material during the base treatment.

It should be noted that, in various embodiments, the order of addition of the base and the surfactant can be reversed. In other words, in certain embodiments, the acid-treated zeolitic material can first be contacted with a base followed by being contacted with surfactant. In still other embodiments, the base and surfactant can be combined prior to contact with the acid-treated zeolitic material, thereby providing simultaneous or substantially simultaneous contact with the zeolitic material. In yet other embodiments, the base treatment and the surfactant treatment may be performed at least partially separately.

In various embodiments, the acid treatment can precede the surfactant treatment and the base treatment. In such embodiments, the surfactant treatment can precede the base treatment or the surfactant treatment can occur substantially concurrently with the base treatment as described above. In other embodiments, the acid treatment is followed by the base treatment. In such embodiments, the surfactant treatment can be excluded and the acid and base can be added at distinctly separate times in order to not harm the zeolitic material. In yet other embodiments, the acid treatment and surfactant treatment can occur substantially concurrently as described above followed by the base treatment. In still yet other embodiments, the surfactant treatment can be followed by the acid treatment and then the base treatment. It should be noted that each of these various embodiments can include an optional acid post treatment, which is described further below, that follows the acid treatment, surfactant treatment, and base treatment.

Although the acid treatments, surfactant treatments, and base treatments are described separately above, it should be noted that all of these treatments can occur in the same reaction zone or reactor, which can facilitate the absence of filtration and/or purification steps between the treatments.

In various embodiments, the method described herein can occur in a single continuously stirred-tank reactor. In such embodiments, the entire method would occur in this single reactor. Alternatively, in various embodiments, multiple continuous stirred-tank reactors that are connected may be used wherein each of the treatments occurs in a separate reactor. In such embodiments, there would be no filtration or purification treatments performed on the reaction mixture when being transferred between the reactors.

In other various embodiments, the method can occur in a continuous flow pipe reactor wherein each of the treatments occurs in a separate zone of the reactor. In such embodiments, the various reagents may be added at different positions along the pipe reactor.

Following the base treatment, the pH of the liquid phase in the resulting treatment mixture can optionally be adjusted. For example, the pH of the resulting treatment mixture can be adjusted to fall within the range of from about 5 to about 8, or in the range of from about 6 to about 7. Various pH adjusting agents (e.g., acids or bases) may be employed during this optional pH adjustment step.

Following treatment with a base, at least a portion of the resulting mesoporous zeolitic material can be separated from the liquid phase in the basic treatment mixture. For example, the resulting mesoporous zeolitic material can be filtered, washed, and/or dried. In one or more embodiments, the mesoporous zeolitic material can be filtered via vacuum filtration and washed with water. Thereafter, the recovered mesoporous zeolitic material can optionally be filtered again and optionally dried.

In embodiments where a pore forming agent, such as a surfactant, is absent from the process, the separated liquid phase will contain no surfactant. Thus, in various embodiments, the liquid phase separated from the mesoporous zeolitic material can comprise a surfactant in an amount less than 5,000, 25,000, 1,000, 500, 100, 50, 20, or 5 ppmw.

Following the filter, wash, and drying steps, the mesoporous zeolitic material can be subjected to additional heat treatment, steam treatment, or chemical extraction in order to remove or recover at least a portion of the pore forming agent, if employed. In one or more embodiments, the mesoporous zeolitic material can be calcined in nitrogen at a temperature in the range of from about 400 to about 600° C. or about 500 to about 600° C., and then in air for pore forming agent (e.g., surfactant) removal. The pore forming agent removal technique is selected based, for example, on the time needed to remove all of the pore forming agent from the mesoporous zeolitic material. The total time period employed for heat treatment of the mesoporous zeolitic material can be in the range of from about 30 minutes to about 24 hours, or in the range of from 1 to 12 hours. In various embodiments, this can include subjecting the mesoporous zeolitic material to ammonium exchange, azeotropic distillation, steam treatment, calcination, or a combination thereof.

In various embodiments, the resulting mesoporous zeolitic material can be subjected to one or more post-formation treatments. In various embodiments, the mesoporous zeolitic material can be subjected to one or more post-formation treatments selected from the group consisting of calcination, ion exchange, steaming, incorporation into an adsorbent, incorporation into a catalyst, re-alumination, acid treatment, silicon incorporation, incorporation into a membrane, and combinations of two or more thereof. Suitable ion exchange procedures for the resulting mesoporous zeolitic material include, but are not limited to, ammonium ion exchange, rare earth ion exchange, lithium ion exchange, potassium ion exchange, calcium ion exchange, and combinations of two or more thereof. The ion exchange can be used to reduce the amount of sodium oxide in the mesoporous zeolitic material. For example, the ion exchange treatments can reduce the sodium oxide content of the mesoporous zeolitic material to less than 5, 2, 1.5, 1, or 0.5 weight percent.

In various embodiments, following separation from the basic treatment mixture, the mesoporous zeolitic material can be subjected to a first ion exchange. For example, the mesoporous zeolitic material can be ion exchanged with a solution of $NH_4NO_3$. Thereafter, in various embodiments, the mesoporous zeolitic material can be subjected to calcination. In one or more embodiments, the mesoporous zeolitic material can be subjected to one or more calcinations at a temperature in the range of from about 500 to about 700° C. In various embodiments, an initial calcination can be performed under 100% water vapor, or a mixture of water vapor and $NH_3$ (e.g., up to 50% $NH_3$, with the remainder water vapor) at a temperature of about 650° C. for a period of time (e.g., half an hour). Thereafter, the mesoporous zeolitic material can be cooled to a temperature of about 550° C. and calcined under a nitrogen environment for a period of time (e.g., 1 hour) followed by calcination under an air environment for a period of time (e.g., 1 hour). The total time period employed for heat treatment of the mesoporous zeolitic material can be in the range of from about 30 minutes to about 24 hours, or in the range of from 1 to 12 hours. Following calcination, the mesoporous zeolitic material can undergo a second ion exchange (e.g., with a solution of $NH_4NO_3$).

Additionally, in certain embodiments, following separation from the basic treatment mixture, the mesoporous zeolitic material can be further contacted with an acid. Specific examples of acids suitable for use include, but are not limited to, hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof.

The resulting mesoporous zeolitic material can be a one-phase hybrid single crystal having long-range crystallinity, or be fully crystalline, and can include mesopore surfaces defining a plurality of mesopores. As used herein, the terms "long-range crystallinity" and "fully crystalline" are substantially synonymous, and are intended to denote solids with one or more phases having repeating structures, referred to as unit cells, that repeat in a space for at least 10 nm. Furthermore, a cross-sectional area of each of the plurality of mesopores can be substantially the same. Additionally, in one or more embodiments the mesoporous zeolitic material can be a mesostructured zeolitic material.

Accordingly, in various embodiments, the mesoporous zeolitic material can have a total 20 to 80 Å diameter mesopore volume of at least 0.02, 0.05, 0.06, 0.07, 0.08, 0.09, 0.10, 0.11, 0.12, 0.13, 0.14, 0.15, 0.20, or 0.25 cc/g. Furthermore, the mesoporous zeolitic material can have a total 20 to 80 Å diameter mesopore volume in the range of from about 0.05 to about 0.70 cc/g, in the range of from about 0.10 to about 0.60 cc/g, in the range of from about 0.15 to about 0.50 cc/g, or in the range of from 0.20 to 0.40 cc/g. In other embodiments, the mesoporous zeolitic material can have a total 20 to 80 Å diameter mesopore volume in the range of from about 0.20 to about 0.35 cc/g, or in the range of from about 0.20 to 0.30 cc/g.

In various embodiments, the resulting mesoporous zeolitic material can have a total 20 to 80 Å diameter mesopore volume that is at least 5, 10, 20, 30, 40, 50, 60, 70, 80, 90, 100, 200, 300, 400, or 500 percent greater than the 20 to 80 Å diameter mesopore volume of the above-described initial zeolitic material. Furthermore, the mesoporous zeolitic material can have a total 20 to 80 Å diameter mesopore volume that is at least 0.02, 0.04, 0.05, 0.06, 0.07, 0.08, 0.09, 0.1, 0.2, 0.3, 0.4, or 0.5 cc/g greater than the total 20 to 80 Å diameter mesopore volume of the initial zeolitic material.

In one or more embodiments, the mesoporous zeolitic material can have a total 20 to 300 Å diameter mesopore volume that is at least 5, 10, 20, 30, 40, 50, 60, 70, 80, 90, 100, 200, 300, 400, or 500 percent greater than the 20 to 300 Å diameter mesopore volume of the initial zeolitic material. Furthermore, the mesoporous zeolitic material can have a total 20 to 300 Å diameter mesopore volume that is at least 0.01, 0.02, 0.03, 0.04, 0.05, 0.06, 0.07, or 0.1 cc/g greater than the total 20 to 300 Å diameter mesopore volume of the initial zeolitic material.

In one or more embodiments, the mesoporous zeolitic material can have a total 20 to 300 Å diameter mesopore volume of at least 0.01, 0.02, 0.05, 0.07, 0.08, 0.09, 0.10, 0.11, 0.12, 0.13, 0.14, or 0.15 cc/g. Additionally, the mesoporous zeolite can have a total 20 to 300 Å diameter mesopore volume in the range of from about 0.05 to about 0.80, in the range of from about 0.10 to about 0.60 cc/g, or in the range of from about 0.15 to about 0.40 cc/g.

In various embodiments, the mesoporous zeolitic material can have a 0 to 20 Å micropore volume of at least 0.10, 0.11, 0.12, 0.13, 0.14, or 0.15 cc/g. Additionally, the mesoporous zeolitic material can have a total 0 to 20 Å diameter micropore volume in the range of from about 0 to about 0.40 cc/g, in the range of from about 0.01 to about 0.35 cc/g, in the range of from about 0.02 to about 0.30 cc/g, or in the range of from about 0.03 to about 0.25 cc/g.

In one or more embodiments, the mesoporous zeolitic material can have a crystalline content of at least 10, 20, 25, 30, 35, 40, 45, 50, 55, 60, 65, 70, 75, 80, 85, 90, 95, or 99 weight percent as measured by X-ray diffraction ("XRD").

Accordingly, in one or more embodiments, the mesoporous zeolitic material can have a crystalline content that is less than the crystalline content of the initial zeolitic material, such as, for example, at least 1, 5, 10, 15, 20, 25 30, 35, or 40 percent less than the crystalline content of the initial zeolitic material as measured by XRD. In further embodiments, the mesoporous zeolitic material can have a reduced crystalline content that is within 50, 45, 40, 35, 30, 25, 20, 15, or 10 percent of the initial zeolitic material.

In various embodiments, the mesoporous zeolitic material can have a silica to alumina molar ratio that is at least 5, 10, 15, 20, 25, 30, 35, 40, 45, or 50 percent higher than the initial zeolitic material. Additionally or alternatively, the mesoporous zeolitic material can have a silica to alumina molar ratio that is not more than 300, 200, 150, 100, 65, or 50 percent higher than the initial zeolitic material. For example, the mesoporous zeolitic material can have a silica to alumina ratio in the range of 4 to 120, 5 to 50, or 5.5 to 7.5.

In various embodiments, the base treatment decreases the zeolite surface area ("ZSA") surface area of the initial zeolite, while increasing the matrix surface area ("MSA") of the initial zeolite. All surface areas are measured by applying BET theory and observing t-plot analysis of the gas sorption results.

For example, the mesoporous zeolitic material can have a ZSA that is at least 10, 20, 30, 40, or 50 percent and/or not more than 200, 150, 125, 100, or 95 percent lower than the ZSA of the initial zeolitic material. In certain embodiments, the mesoporous zeolitic material has a ZSA in the range of 500 to 1,200 m$^2$/g, or 450 to 800 m$^2$/g.

Furthermore, in certain embodiments, the mesoporous zeolitic material can have a MSA that is at least 10, 30, 50, 100, or 200 percent and/or not more than 1,000, 750, 500, 400, or 300 percent greater than the MSA of the initial zeolitic material. For example, the mesoporous zeolitic material can have a MSA in the range of 40 to 300 m$^2$/g, or 100 to 140 m$^2$/g.

In certain embodiments, the mesoporous zeolitic material can have a lower UCS relative to the initial zeolitic material. For example, the mesoporous zeolitic material can have a UCS that is at least 0.01, 0.02, 0.04, 0.06, 0.08, or 0.10 less than the UCS of the initial zeolitic material.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

In this example, two samples were made, one with a comparative process which incorporates a filtration step before the base treatment step (A) and one with the process of the present invention (B).

A slurry of a commercial NaY at 25 weight percent solids was created by mixing 307 grams of 65 weight percent solids NaY powder and 493 grams of water for a total of 800 grams of slurry with a measured pH of 9.71. The slurry temperature was maintained at 25° C. and the slurry pH was adjusted to 6.51 with the addition of 1.3 grams of 25 weight percent of sulfuric acid while stirring. A 25 weight percent solution of citric acid was formed by mixing 57.6 grams of citric acid solid in 173 grams of water, which was dosed into the stirred zeolite slurry for over 60 minutes. After addition was complete, the pH of the slurry was adjusted to 6.5 with the addition of a 25 weight percent solution of NaOH. The slurry was heated to 80° C. and 13.7 grams of a 30 weight percent CTAC solution was added. The slurry was stirred for 1 hour, after which the slurry was divided into two halves.

The first half (marked "A") was filtered and washed three times with hot deionized water. This filter cake was then mixed with water to form a 25 weight percent solids slurry and heated to 80° C. This was marked "Slurry A." The second half of the original slurry was marked "Slurry B."

Slurry A was dosed with 7.8 grams of 25 weight percent of a NaOH solution for over 2 hours. The final pH of the slurry was measured at 10.6. After the addition was complete, the pH was adjusted to 6.5 with the addition of a 25 weight percent sulfuric acid. The slurry was then filtered and washed 3 times with hot deionized water.

Slurry B was separately dosed with 7.8 grams of a 25 weight percent NaOH solution over 2 hours. The final pH of the slurry was measured at 8.42. After the addition was complete, the pH was adjusted to 6.5 with the addition of 25 weight percent sulfuric acid. The slurry was filtered and washed 3 times with hot deionized water.

Both of the cakes, from Slurry A and from Slurry B, were subsequently twice ion exchanged to remove Na using a $NH_4NO_3$ solution at 80° C. and were subsequently calcined at 550° C. in steam and nitrogen for two hours followed by in air atmosphere for another two hours. Both cakes were ion exchanged a second time to further remove Na from the zeolite and then steamed at 780° C. in 100% steam for 8 hours. The physical properties of the two samples, A and B, are given in Table 1 below.

TABLE 1

| Sample | % $Na_2O$ | SAR | % Crys | Unit Cell Size | POSD 0-20 Å | POSD 20-80 Å | POSD 20-300 Å | ZSA | MSA |
|---|---|---|---|---|---|---|---|---|---|
| A | 0.338 | 6.964 | 88.59 | 24.2531 | 0.20718 | 0.02535 | 0.16785 | 510.912 | 82.617 |
| B | 0.32 | 6.832 | 84.56 | 24.2565 | 0.20179 | 0.03113 | 0.17422 | 495.828 | 90.084 |

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A method for producing a material comprising a mesoporous zeolite, said method comprising:
    (a) contacting an initial zeolitic material with an acid to produce an acid-treated zeolitic material, wherein said contacting of step (a) is carried out in a first slurry comprising a first solid phase and a first liquid phase; and
    (b) subsequent to step (a), contacting said acid-treated zeolitic material with a base to thereby provide a base-treated zeolitic material, wherein said contacting of step (b) is carried out in a second slurry comprising a second solid phase and a second liquid phase, wherein at least 30 weight percent of said first liquid phase is also present in said second liquid phase,
    wherein the 20 to 80 Å diameter mesopore volume of said base-treated zeolitic material is greater than the mesopore volume of said initial zeolitic material,
    wherein the pH of said second liquid phase is higher than the pH of said first liquid phase.

2. The method of claim 1, further comprising contacting a surfactant with at least one of said initial zeolitic material, said acid-treated zeolitic material, and/or said base-treated zeolitic material.

3. The method of claim 2, wherein the amount of said surfactant contacted with said initial zeolitic material, said acid-treated zeolitic material, and/or said base-treated zeolitic material is in the range of 0.01 to 0.2 grams of surfactant per gram of dry zeolitic material.

4. The method of claim 2, wherein said surfactant is contacted with said initial zeolitic material and/or said acid-treated zeolitic material.

5. The method of claim 2, wherein said surfactant is contacted with said acid-treated zeolitic material.

6. The method of claim 2, wherein said surfactant and said acid are simultaneously contacted with said initial zeolitic material.

7. The method of claim 1, wherein at least 90 weight percent of said first liquid phase is also present in said second liquid phase.

8. The method of claim 1, further comprising, subsequent to step (b), separating said second solid phase from said second liquid phase, wherein the separated second solid phase comprises said base-treated zeolitic material.

9. The method of claim 8, wherein said separated second liquid phase comprises a surfactant in an amount less than 5,000 ppmw.

10. The method of claim 8, further comprising, subsequent to said separating, reducing the sodium oxide content of said base-treated zeolitic material to less than 5 weight percent.

11. The method of claim 8, further comprising, subsequent to said separating, contacting said separated second solid phase with an acid.

12. The method of claim 1, wherein steps (a) and (b) are carried out in a common reaction zone within a single continuously stirred-tank reactor.

13. The method of claim 1, wherein steps (a) and (b) are carried out in multiple reaction zones in a continuous flow pipe reactor.

14. The method of claim 1, wherein said first liquid phase has a final pH in the range of 1.5 to 4.

15. The method of claim 1, wherein said second liquid phase has a final pH in the range of 5 to 11.

16. The method of claim 1, wherein said first and second liquid phases each comprise at least 50 weight percent of water.

17. The method of claim 1, wherein said first and second slurries each have a solids content in the range of 5 to 60 weight percent.

18. The method of claim 1, wherein the 20 to 80 Å diameter mesopore volume of said base-treated zeolitic material is at least 20 percent greater than the mesopore volume of said initial zeolitic material.

19. The method of claim 1, wherein said initial zeolitic material comprises a faujasite.

20. The method of claim 1, wherein said initial zeolitic material comprises a composite shaped article comprising a zeolite.

21. The method of claim 1, wherein said contacting of step (a) is carried out in the substantial absence of hydrofluoric acid.

22. A method for forming a mesoporous zeolitic material, said method comprising:
(a) contacting an initial zeolitic material with an acid to thereby form a first mixture comprising at least a portion of said acid, an acid-treated zeolitic material, and a liquid, wherein said contacting is carried out in the substantial absence of hydrofluoric acid;
(b) contacting said first mixture with a surfactant to thereby form a second mixture comprising at least a portion of said surfactant, at least a portion of said acid, at least 30 weight percent of said liquid from said first mixture, and a surfactant-treated zeolitic material;
(c) contacting said second mixture with a base to thereby form a third mixture comprising at least a portion of said acid, at least a portion of said surfactant, at least a portion of said base, at least 30 weight percent of said liquid from said first mixture, and a base-treated zeolitic material; and
(d) recovering at least a portion of said base-treated zeolitic material from said third mixture to thereby form said mesoporous zeolitic material.

23. The method of claim 22, wherein at least a portion of said contacting of step (a) and said contacting of step (b) occur simultaneously.

24. The method of claim 22, wherein at least a portion of said contacting of step (b) and said contacting of step (c) occur simultaneously.

25. The method of claim 22, wherein the amount of said surfactant contacted with said first mixture is in the range of 0.01 to 0.2 grams of surfactant per gram of dry zeolitic material.

26. The method of claim 22, wherein at least 90 weight percent of said liquid from said first mixture is also present in said second mixture.

27. The method of claim 22, wherein at least 90 weight percent of said liquid from said second mixture is also present in said third mixture.

28. The method of claim 22, further comprising reducing the sodium oxide content of said mesoporous zeolitic material to less than 5 weight percent.

29. The method of claim 22, further comprising contacting said mesoporous zeolitic material with an acid.

30. The method of claim 22, wherein steps (a)-(c) are carried out in a common reaction zone within a single continuously stirred-tank reactor.

31. The method of claim 22, wherein steps (a) and (b) are carried out in multiple reaction zones in a continuous flow pipe reactor.

32. The method of claim 22, wherein said first mixture has a final pH in the range of 1.5 to 4.

33. The method of claim 22, wherein said third mixture has a final pH in the range of 5 to 11.

34. The method of claim 22, wherein said first mixture, second mixture, and third mixture have a solids content in the range of 5 to 60 weight percent.

35. The method of claim 22, wherein the 20 to 80 Å diameter mesopore volume of said mesoporous zeolitic material is at least 20 percent greater than the mesopore volume of said initial zeolitic material.

36. The method of claim 22, wherein said initial zeolitic material comprises a faujasite.

37. The method of claim 22, wherein said initial zeolitic material comprises a composite shaped article comprising a zeolite.

38. A method for producing a material comprising a mesoporous zeolite, said method comprising:
(a) contacting an initial zeolite with an acid to produce an acid-treated zeolite, wherein said contacting of step (a) is carried out in a first slurry comprising a first solid phase and a first liquid phase; and
(b) subsequent to step (a), contacting said acid-treated zeolite with a base and a surfactant to thereby provide a base-treated zeolite, wherein said contacting of step (b) is carried out in a second slurry comprising a second solid phase and a second liquid phase, wherein at least 30 weight percent of said first liquid phase is also present in said second liquid phase,
wherein the 20 to 80 Å diameter mesopore volume of said base-treated zeolite is greater than the mesopore volume of said initial zeolite,
wherein the pH of said second liquid phase is higher than the pH of said first liquid phase.

39. The method of claim 38, wherein the amount of said surfactant contacted with said acid-treated zeolitic material is in the range of 0.01 to 0.2 grams of surfactant per gram of dry zeolitic material.

40. The method of claim 38, wherein at least 90 weight percent of said first liquid phase is also present in said second liquid phase.

41. The method of claim 38, further comprising, subsequent to step (b), separating said second solid phase from said second liquid phase, wherein the separated second solid phase comprises said base-treated zeolitic material.

42. The method of claim 41, further comprising, subsequent to said separating, reducing the sodium oxide content of said base-treated zeolitic material to less than 5 weight percent.

43. The method of claim 41, further comprising, subsequent to said separating, contacting said separated second solid phase with an acid.

44. The method of claim 38, wherein steps (a) and (b) are carried out in a common reaction zone within a single continuously stirred-tank reactor.

45. The method of claim 38, wherein steps (a) and (b) are carried out in multiple reaction zones in a continuous flow pipe reactor.

46. The method of claim 38, wherein said first liquid phase has a final pH in the range of 1.5 to 4.

47. The method of claim 38, wherein said second liquid phase has a final pH in the range of 5 to 11.

48. The method of claim 38, wherein said first and second liquid phases each comprise at least 50 weight percent of water.

49. The method of claim 38, wherein said first and second slurries each have a solids content in the range of 5 to 60 weight percent.

50. The method of claim 38, wherein the 20 to 80 Å diameter mesopore volume of said base-treated zeolitic material is at least 20 percent greater than the mesopore volume of said initial zeolitic material.

51. The method of claim 38, wherein said initial zeolitic material comprises a faujasite.

52. The method of claim 38, wherein said initial zeolitic material comprises a composite shaped article comprising a zeolite.

53. The method of claim 38, wherein said contacting of step (a) is carried out in the substantial absence of hydrofluoric acid.

* * * * *